United States Patent [19]

Sands et al.

[11] Patent Number: 5,447,340
[45] Date of Patent: Sep. 5, 1995

[54] ELECTRICALLY INSULATED PIPED COUPLING EMPLOYING A RADIAL INSULATING BARRIER

[75] Inventors: Robert E. Sands, Shelbyville; Gary L. Bouc, Decatur, both of Ill.

[73] Assignee: Mueller Co., Decatur, Ill.

[21] Appl. No.: 308,514

[22] Filed: Sep. 21, 1994

[51] Int. Cl.⁶ .............................................. F16L 11/12
[52] U.S. Cl. ...................................... 285/52; 285/328; 285/349
[58] Field of Search ...................... 285/48, 49, 50, 51, 285/52, 53, 328, 349

[56] References Cited

U.S. PATENT DOCUMENTS

| | | | |
|---|---|---|---|
| 2,867,463 | 1/1959 | Snider | 285/52 X |
| 3,278,202 | 10/1966 | Smith | 285/50 |
| 3,517,950 | 6/1970 | Anderson | 285/52 |
| 4,411,457 | 10/1983 | Inoue et al. | 285/54 X |

FOREIGN PATENT DOCUMENTS 1201858 8/1970 United Kingdom ................. 285/54

Primary Examiner—Dave W. Arola
Attorney, Agent, or Firm—Cushman Darby & Cushman

[57] ABSTRACT

An electrically-insulated pipe coupling includes a first tubular metal body, a second tubular metal body which has a cylindrical section and which has molded onto it an electrically-insulating covering extending over the end of the body and a portion of the cylindrical section, a coupling member for securing the two metal bodies together at their respective ends and which is disposed over the juncture of the two metal bodies in such a manner that a portion of the electrically-insulating covering molded onto the second tubular body extends beyond the coupling member, and an electrically-insulating barrier extending outwardly from the cylindrical section of the second tubular body and disposed about the portion of the electrically insulating covering extending beyond the coupling member.

9 Claims, 2 Drawing Sheets

ELECTRICALLY INSULATED PIPED COUPLING EMPLOYING A RADIAL INSULATING BARRIER

BACKGROUND OF THE INVENTION

1. Field of the Invention

This invention relates to an improved electrically insulated pipe coupling or union particularly suitable for buried pipes.

2. Description of the Related Art

Metal pipes are vulnerable to electrical corrosion from two different causes. First, galvanic corrosion can result where two dissimilar metals are coupled together. Second, electrical corrosion can result when stray electrical current travels down a metal pipe, which provides the path of least resistance, and thereby causes corrosion where the current leaves the pipe at an anode site. Stray electrical current in metal piping systems is especially prevalent where a piping system such as water pipes is used as an electrical grounding site.

One method of preventing corrosion due to stray electrical current is by insulating the entire metal pipe system thereby preventing the current from ever entering the pipes. However, it has been shown that this method can actually hasten corrosion because the presence of any flaw in the coating will cause the corrosion to be concentrated at the site of the flaw.

Another means of curing the problem of stray current corrosion is to break the circuit along the metal pipe system so that it is no longer the path of least resistance. Electrically insulated pipe couplings or unions are known in the art and are used primarily to electrically insulate sections of metal pipe from each other to minimize corrosion caused by electrolytic action. However, in underground piping applications, insulated connectors can exacerbate the problem because current may travel through the soil around the insulating junction and cause localized corrosion at the point where the current leaves the pipe to travel around the insulated junction.

SUMMARY OF THE INVENTION

The present invention provides an apparatus for elongating the electrical path across an insulated junction connecting two metal pipes. More particularly, where an insulated pipe junction is used in an underground application, the present invention prevents electrical current from travelling around the insulated junction through the soil.

In a preferred embodiment, a barrier extending radially from the pipe is provided at an insulated pipe junction. This barrier may typically be made of rubber or any other suitable electrically insulating material.

DETAILED DESCRIPTION OF PREFERRED EMBODIMENT

Figure 1:
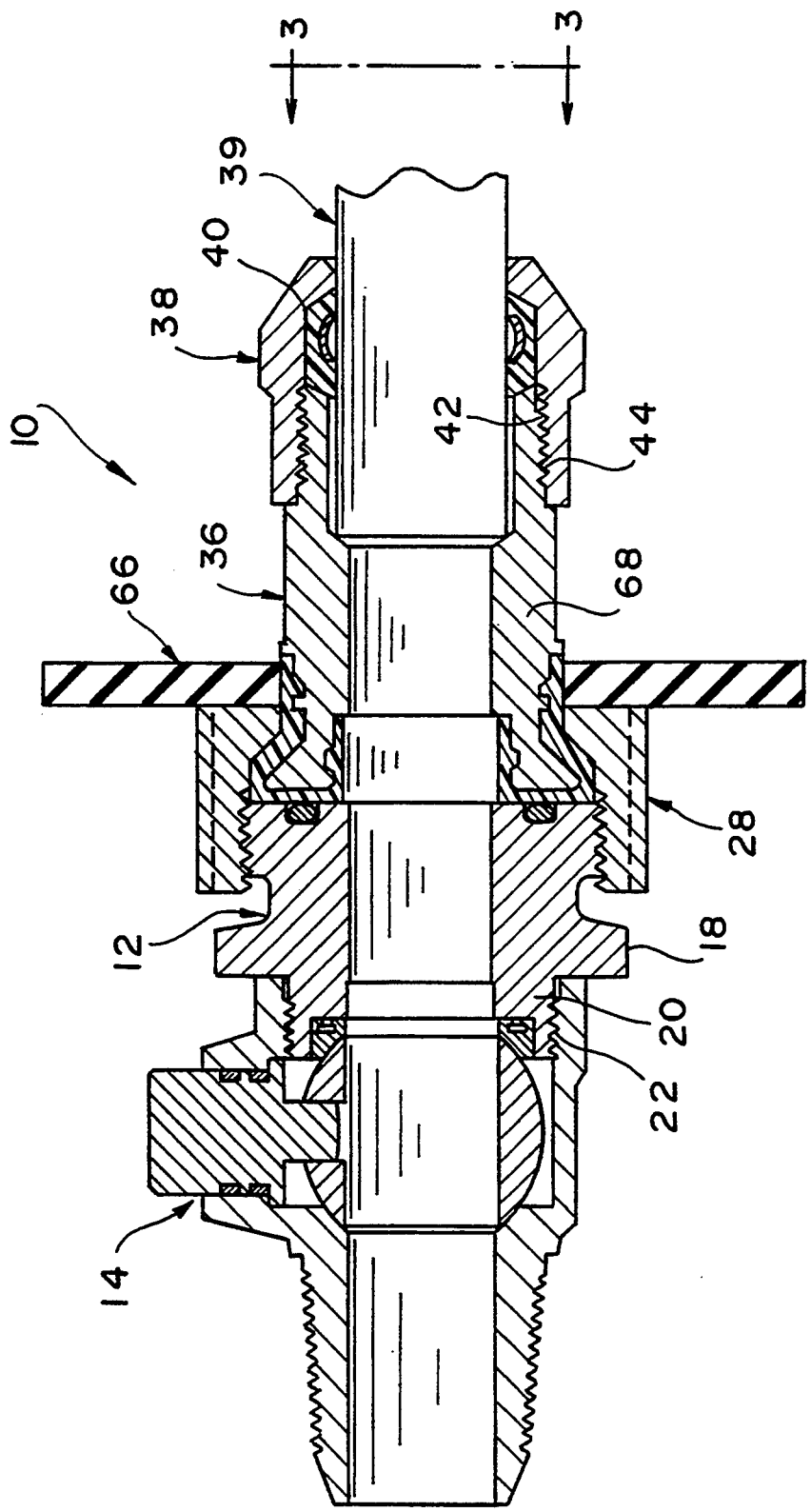
FIG. 1 is a sectional view looking transverse to the longitudinal axis of the pipe coupling.

As shown in FIG. 1, the invention is illustrated with an electrically-insulated union 10 connecting a corporation ball valve 14 to a copper tube 39 using an intermediate connection nut 38 and gasket 40. However, it will be seen that the invention is applicable to joints between any two hollow or tubular members, such as pipes, fittings, valves or the like.

The invention is preferably employed in conjunction with an insulated pipe coupling as described in U.S. Pat. No. 3,115,354.

Figure 2:
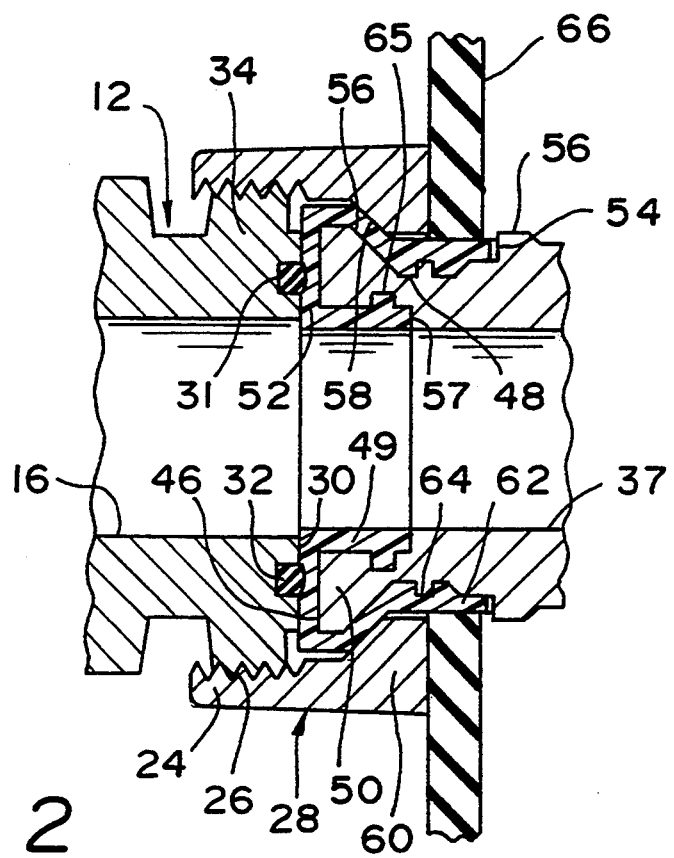
FIG. 2 is an enlarged, fragmentary section of the pipe coupling shown in FIG. 1.

As shown in FIGS. 1 and 2, there is an end piece 12 traversed by a passageway 16. At one end 20 of the end piece 12, there are provided threads 22 for attachment of a mating piece. Although exterior threads are shown, the present invention may accommodate interior threads as well depending on the requirements of the particular application. The threaded end 20 of the end piece 12 may be provided with a noncircular exterior configuration as shown at 18 to facilitate the application of a wrench (not shown). That portion 34 of the end piece 12 surrounding the other end of the passageway 16 is cylindrical and provided with exterior threads 26 for the reception of a coupling nut 28 having interior threads 24. The cylindrical portion 34 of the end piece 12 terminates in a substantially flat annular end surface 30 having an inner edge defined, in this instance, by the passageway 16 and an outer edge defined by the body threads 26.

Recessed into the flat annular end surface 30 is an annular coaxial groove 31 carrying an O-ring 32 of a type well-known in the art and made of a resilient material such as rubber or the like. The diameter of the O-ring 32, in radial section, is only slightly greater than the depth of the groove 31. The O-ring 32 preferably fits snugly within the groove 31, i.e., in frictional engagement with either the inner or outer side walls of the groove.

In order to attach a pipe 39 to the exteriorly threaded end 34 of the end piece 12, an adaptor or tail piece 36 preferably is employed. The tail piece 36 is in the form of a tubular body having a passage way 37 therethrough and having exterior threads 42 at one end adapted to engage corresponding interior threads 44 of a second coupling nut 38 or a cooperatively threaded pipe (not shown). The other end of the tail piece 36 is provided with a flat annular end face 46.

Somewhat spaced from its end face 46, the tail piece 36 is exteriorly reduced and provided with a section 48 of lesser outer diameter, so that in a sense the tail piece may be said to be provided with an exterior enlargement 50 on one end. Starting at its end face 46 and extending somewhat away from the end face, the passage way 37 of the tail piece 36 is radially enlarged to create an inner section 49 of the passage way 37 that is of greater diameter than the remainder of the passage way.

Molded onto the tail piece 36 and completely covering its end face 46, its enlargement 50, its inner section 49 and its section 48 of lesser outer diameter, is a covering 52 of electrically insulating material that also possesses some gasket qualities. The material 52 preferably is made of a durable plastic such as nylon, Delrin, Lexan or the like that not only has electrically insulating properties, but also is somewhat deformable by the pressure thereagainst of a metal member so as to effect a tight seal with such member. The exterior section 48 of the tail piece 36 terminates, at its end opposite end face 46, in a shoulder 54 formed by an exterior circumferential flange 56 and facing end face 46. Inner section 49 also terminates in a shoulder 51 facing end face 46. Shoulders 51 and 54 serve both to aid in molding the covering 52 in place and to prevent damage to the terminal edges of such covering.

The end of the section 48 adjacent end face 46 of the tail piece 36 terminates in, or rather the face of flange 56 of the exterior enlargement 50 opposite end face 46 is a frusto-conically shaped surface having an angular inclination of the order of about 45°. The interior surface 58 of the inwardly extending shoulder 60 of the coupling nut 28 is inclined to the same angle, so that the inter-engaged surfaces 58 and 56 on the coupling nut 28 and on the tail piece 36, or on the electrically insulating covering 52 on the latter, are complementary.

As to the electrical insulating qualities of the joint, it will be seen that the nylon covering 52 on the tail piece 36 is interposed completely between the abutting metal ends 46 and 30 of the tail piece and the end piece so that these two parts cannot make metal-to-metal contact at this point. Furthermore, because the covering 52 is extended to the section of reduced diameter 48 and to the shoulder 54, a portion 62 of the covering 52 extends beyond the coupling nut 28.

When the joint is fully assembled as is shown in FIG. 1, there is increased pressure on the plastic covering 52 exerted by the inclined surfaces 56 and 58 of the tail piece 36 and the coupling nut 28 and by the annular faces 46 and 30 of the tail piece 36 and the end piece 12. Plastic has a tendency to creep or cold flow when it is under stress. Consequently, when the joint is assembled and the plastic material of the covering 52 is compressed between the inter-engaged surfaces 56 and 58, the plastic material between these surfaces is under compression and will tend to creep in opposite directions from between the aforementioned inclined surfaces 56 and 58.

Before the joint is assembled the plastic material covering the section 48 of the tail piece 36 is under tension, i.e., under hoop stress caused by shrinkage of the plastic material on cooling after molding. As the plastic material between the opposed surfaces 56 and 58 tends to creep down toward the material on the outer section 48 and the inner section 49, the entire cylindrical sections of the plastic material covering the outer section 48 and the inner section 49 of the tail piece 36 tend to move axially toward the shoulders 54 and 51. Excessive creep by the plastic covering 52 can reduce the compressive stresses between the inclined surfaces 56 and 58 and reduce the amount of torque required to loosen the coupling nut 28, certainly an undesirable effect.

Most of the aforementioned creep of the plastic material can be reduced or avoided by providing the outer section 48 and the inner section 49 of the tail piece 36 with a surface that is sufficiently rough to prevent axial movement of the cylindrical section of plastic material molded thereon. The roughening of the surface of this section can be accomplished in various ways, such as by knurling or the like. Preferably, however, the surface of the section 48 of the tail piece 36 is roughened by providing such section with two or more circumferential grooves separated by ribs. Thus, for example, the cylindrical section 48 may be provided with a circumferential rib 64. In addition, inner section 49 can be provided, for example, with a circumferential channel 65. In this construction, it will be seen that on creepage of compressively stressed plastic material from between the inclined surfaces 56 and 58 toward the outer section 48 and the inner section 49 of the tail piece 36, the rib 64 and the channel 65 will resist any rearward axial movement of the plastic material.

Figure 3:
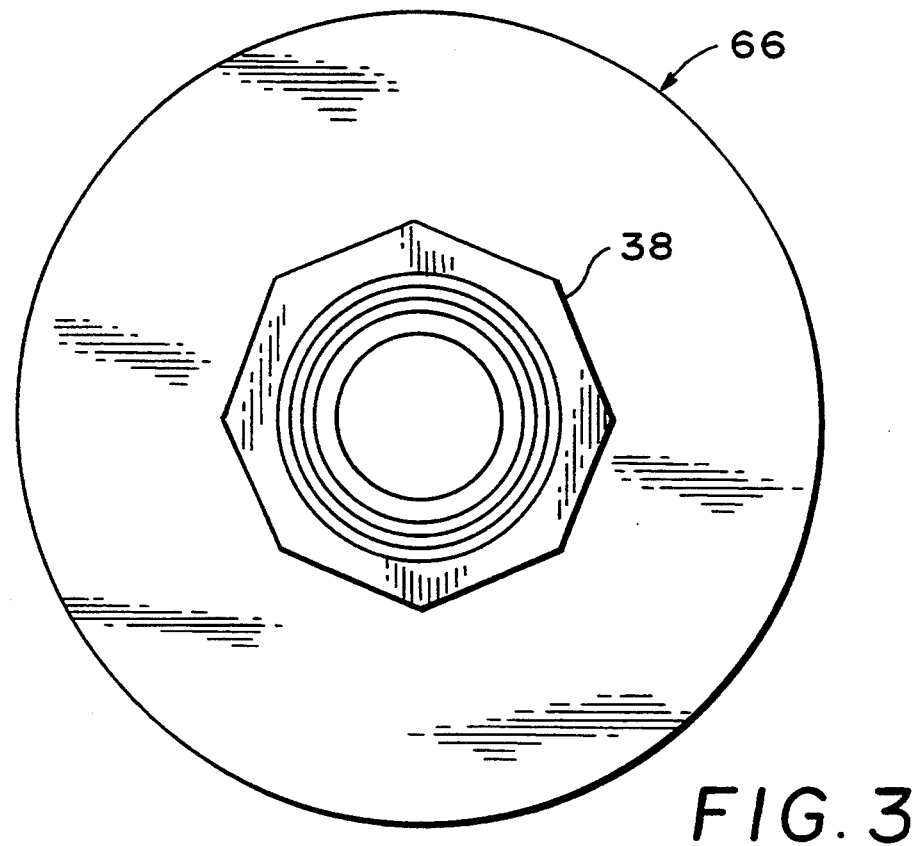
FIG. 3 is an end view looking in the direction 3—3.

As shown in FIGS. 1, 2 and 3, supported on portion 62 of the plastic covering 52 that extends beyond the coupling nut 28 is an electrically-insulating barrier 66 in the form of a flat disk extending radially from the tail piece 36. The barrier 66 may be made of rubber or some other suitable electrically insulating material. It will be seen that the electrically insulating barrier 66 effectively increases the distance electric current must pass to traverse the path from the metal coupling nut 28 to the nearest metal region 68 of the tail piece 36. Accordingly, by selecting a barrier of suitable diameter, corrosion due to current flow will be easily reduced, if desired, so as to be negligible. It is believed that a barrier having a diameter larger than that the nut 28 is adequate to provide the desired level of protection. In some cases a diameter of at least 4 inches and perhaps as great as 10 or more inches will provide sufficient corrosion protection for underground pipe applications.

Having described the invention, it will be apparent to those skilled in the art that various modifications may be made thereto without departing from the spirit and scope of this invention as defined in the appended claims.

What is claimed is:

1. An insulated pipe coupling system comprising:
   a first tubular metal body having a terminal end;
   a second tubular metal body having a terminal end and an exterior body section;
   an electrically-insulating covering continuously molded over said terminal end of said second tubular body and covering at least a portion of said exterior body section adjacent said terminal end;
   a coupling member for securing said first and second tubular bodies together at their said terminal ends, said coupling member being disposed about the juncture of said first tubular body with said second tubular body such that a portion of said electrically-insulating covering extends along said exterior body section beyond said coupling mechanism, said electrically-insulating covering preventing any metal-to-metal contact between said second tubular body and either said first tubular body or said coupling mechanism; and
   an electrically-insulating barrier extending radially outwardly from said exterior body section of said second tubular body and disposed about the portion of said electrically-insulating covering extending beyond said coupling member, said electrically-insulating barrier effectively elongating the electrical path from said first tubular body and said coupling member to said second tubular body.

2. The insulated pipe coupling system of claim 1 wherein said first tubular metal body terminates in a cylindrical portion having an annular end face pierced by a central passage way, said end face being provided with a flat annular surface and an annular groove having a bottom in said surface surrounding said passageway, said annular groove having disposed within it an O-ring, the diameter of said ring in radial section being slightly greater than the depth of said groove so that said ring is partially compressed between said groove bottom and said covering to effect a seal.

3. The insulated pipe coupling system of claim 2 wherein said second tubular metal body terminates at one end in a flat annular end face opposed to said flat annular surface on said first tubular metal body, said second tubular body further having an exterior enlargement on its said one end, said exterior enlargement having a sloped face opposite said annular surface, said sloped face having an angular inclination and merging with a generally cylindrical section of lesser diameter than the remainder of said second tubular body, said cylindrical section terminating in a first shoulder facing said one end, said second tubular body further having a passageway therethrough, said passageway having an inner section of greater diameter than the remainder of said passageway, said inner section extending from said one end and terminating in a second shoulder facing said one end.

4. The insulated pipe coupling system of claim 3 wherein said electrically insulating covering is a composed of gasket material, having cold flow characteristics, molded onto said second tubular body end face, onto said enlargement, onto said cylindrical section, and onto said inner section, the outer surface of said covering on said cylindrical section defining a cylinder of substantially constant diameter.

5. The insulated pipe coupling system of claim 4 wherein said coupling member is a nut having a flange provided with a surface portion complementary to and engaged with a portion of said covering on said sloped face of said exterior enlargement and threaded onto said cylindrical portion of said first tubular metal body to force said end face thereof into sealing engagement with said covering on said second tubular body end face, the compressive force thus developed being exerted through said covering and tending to cause cold flow thereof, whereby said first and second shoulders of said cylindrical and inner sections act as dams to prevent cold flow of said covering.

6. The insulated pipe coupling system of claim 5 in which said cylindrical section is further provided with a roughened surface at a position between said sloped face and said first shoulder and said inner section is provided with a roughened surface at a position between said end face and said second shoulder, whereby said roughened surfaces further inhibit cold flow of said covering.

7. The insulated pipe coupling system of claim 5 in which said cylindrical section is further provided with a circumferential rib at a position between said sloped face and said first shoulder and said inner section is provided with a circumferential channel at a position between said end face and said second shoulder, whereby said channel and said rib further inhibit cold flow of said covering.

8. The insulated pipe coupling system of claim 1 wherein said electrically insulating barrier extends radially from the center of said second tubular body at least four inches.

9. The insulated pipe coupling system of claim 1 wherein said electrically insulating barrier extends radially from the center of said second tubular body at least ten inches.

* * * * *